US007337963B2

(12) United States Patent
Harper et al.

(10) Patent No.: US 7,337,963 B2
(45) Date of Patent: Mar. 4, 2008

(54) PORTAL SYSTEM FOR A CONTROLLED SPACE

(75) Inventors: Lawrence Edward Harper, Marietta, GA (US); Derry Thomas DeNise, Decatur, GA (US)

(73) Assignee: WinWare, Inc., Marietta, GA (US)

( * ) Notice: Subject to any disclaimer, the term of this patent is extended or adjusted under 35 U.S.C. 154(b) by 471 days.

(21) Appl. No.: 10/990,907

(22) Filed: Nov. 17, 2004

(65) Prior Publication Data

US 2005/0240495 A1 Oct. 27, 2005

Related U.S. Application Data

(60) Provisional application No. 60/565,089, filed on Apr. 23, 2004.

(51) Int. Cl.
 G06F 19/00 (2006.01)
 G06Q 30/00 (2006.01)
 G06Q 90/00 (2006.01)
(52) U.S. Cl. .................. 235/385; 235/382; 235/381
(58) Field of Classification Search ................ 235/381, 235/383, 385; 705/22, 28
 See application file for complete search history.

(56) References Cited

U.S. PATENT DOCUMENTS

| 4,866,661 | A  | * | 9/1989  | de Prins ................ 235/382 |
| 5,671,362 | A  | * | 9/1997  | Cowe et al. ............ 705/28 |
| 5,693,134 | A  |   | 12/1997 | Stephens .............. 106/415 |
| 6,182,053 | B1 |   | 1/2001  | Rauber et al. ......... 705/28 |
| 6,195,006 | B1 |   | 2/2001  | Bowers et al. ....... 340/572.1 |
| 6,549,891 | B1 |   | 4/2003  | Rauber et al. ......... 705/28 |
| 6,681,990 | B2 | * | 1/2004  | Vogler et al. ........... 235/385 |
| 6,693,539 | B2 |   | 2/2004  | Bowers et al. ....... 340/572.1 |
| 6,708,879 | B2 | * | 3/2004  | Hunt .................... 235/385 |
| 6,935,560 | B2 | * | 8/2005  | Andreasson et al. ... 235/385 |
| 6,996,538 | B2 | * | 2/2006  | Lucas .................... 705/28 |
| 7,120,278 | B2 | * | 10/2006 | Sukegawa et al. ..... 382/118 |
| 7,140,542 | B2 | * | 11/2006 | Andreasson et al. ... 235/385 |
| 7,202,785 | B2 | * | 4/2007  | Maloney ............... 340/568.1 |
| 2001/0000019 | A1 |   | 3/2001  | Bowers, et al. ....... 340/572.1 |
| 2002/0118111 | A1 | * | 8/2002  | Brown et al. ......... 340/573.1 |
| 2002/0183882 | A1 |   | 12/2002 | Dearing et al. ........ 700/115 |
| 2002/0198795 | A1 |   | 12/2002 | Dorenbosch ........... 705/28 |
| 2003/0034390 | A1 |   | 2/2003  | Linton et al. .......... 235/382 |

* cited by examiner

*Primary Examiner*—Uyen-Chau N Le
(74) *Attorney, Agent, or Firm*—Thomas, Kayden, Horstemeyer & Risley, LLP

(57) ABSTRACT

Systems, devices, and methods are provided for monitoring and tracking an item in a controlled space. In one embodiment, a portal system that monitors the controlled space includes a radio frequency tag that is attached to inventory and a portal device, which includes a computing device, a receiver and a locking door. The receiver is configured to receive a signal from radio frequency tag, and send the signal to the computing device. The locking door is coupled to the computing device. The computing device is configured to verify whether the user is authorized to be taking inventory in and out of the controlled space through the locking door based on the received signal, and to unlock the locking door based on the received signal. The computing device has a database that includes the total value of the inventory that the user has taken out of the controlled space. The computing device determines whether the user have exceeded a threshold value of inventory based on the total value of inventory that the user has taken out of the controlled space, and provides a notification signal to an administrator based on the total value of inventory.

25 Claims, 8 Drawing Sheets

PORTAL SYSTEM FOR A CONTROLLED SPACE

CROSS-REFERENCE TO RELATED APPLICATION

This application is related to U.S. provisional patent application entitled "A System for Tracking Inventory" filed on Apr. 23, 2004 and accorded Ser. No. 60/565,089 now abandoned, which is entirely incorporated herein by reference.

TECHNICAL FIELD

The present invention is generally related to monitoring and tracking objects and items, and more particularly, to systems, devices and methods for monitoring and tracking objects and items in a controlled space.

BACKGROUND OF THE DISCLOSURE

Companies typically have difficulties tracking inventory items and their usage within their facilities. Many inventory items are misused, misplaced, and improperly tracked and replenished by the employees of the companies. Therefore, companies have incentives to track the items, hold employees responsible for missing items, properly account costs, and replenish the missing items based on demand. Typically items of the inventory are kept in a controlled space that is monitored. Some companies have used locking doors with keypads that allow only employees with authorized code to enter the controlled space. In addition, computers and bar code tags have been used to track the items in and out of the controlled space. However, these systems still lack tracking information, cost accounting information, security methods, and replenishment information in the process of tracking and monitoring the items stored in the controlled space and linking the responsible employee with the items being taken in and out of the controlled space. Therefore, from the above, it can be appreciated that it would be desirable to have a system, device and method for monitoring and tracking items stored in a controlled space.

SUMMARY OF THE INVENTION

The present invention provides systems, devices and methods for monitoring and tracking an item in the controlled space. Briefly described, in architecture, one embodiment of the system, among others, can be implemented as follows. A portal system that monitors a controlled space includes a radio frequency tag that is attached to an item in inventory and a portal device, which includes a computing device, a receiver and a locking door. The item is typically material that is used to make or maintain a product (e.g., aircraft, automotive parts, facilities, etc.). The item can be, for example but not limited to, a rivet gun, screwdriver, gage, spare part, fluids, etc. The receiver is configured to receive signals from the radio frequency tag, and send the signal to the computing device. The locking door is coupled to the computing device. The computing device is configured to verify whether the user is authorized to be taking inventory in and out of the controlled space through the locking door based on the received signals. The computing device is configured to lock and unlock the locking door based on the determination that the user is authorized.

In another embodiment, the computing device has a user database in memory. The user database includes a total value of inventory that the user has taken out of the controlled space. The computing device determines whether the user and/or the cost center have exceeded a threshold value of inventory based on the total value of inventory that the user has taken out of the controlled space. The computing device is configured to provide a notification signal, such as an electronic reporting, to an administrator based on the total value of inventory that the user has taken out of the controlled space. The notification signal indicates that the budget usage of the inventory has exceeded a threshold value.

In another embodiment, a portal device that monitors a controlled space includes a computing device and a locking door. The computing device is electrically coupled to a graphical user interface, which is located outside the controlled space. The locking door is coupled to the computing device, which is configured to lock and unlock the locking door based on code inputted by a user through the graphical user interface upon entering and exiting the controlled space.

In another embodiment, a method of monitoring a controlled space includes the steps of receiving data from a user via a graphical user interface located outside of the controlled space; determining whether the user is authorized to unlock a locking door based on the received data; unlocking the locking door based on the received data; and tracking inventory based on the received data when the user enters and exits the controlled space.

In another embodiment, a method of monitoring a controlled space includes the steps of receiving data from a user that identifies the user; associating the user with a total value of inventory that the user has taken out of the controlled space; determining whether the user is authorized to unlock a locking door based on the received data; determining whether the user has exceeded a threshold value of inventory based on the total value of inventory; unlocking the locking door based on the received data; and providing a notification signal based on the total value of inventory associated to the user.

In another embodiment, a method of monitoring a controlled space includes the steps of receiving a signal from a radio frequency tag, the radio frequency tag being attached to a user; determining whether the signal from the radio frequency tag authorizes the user to be taking inventory in and out of the controlled space; and unlocking a locking door based on the signal from the radio frequency tag that is attached to the user.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE DISCLOSURE

Figure 1:
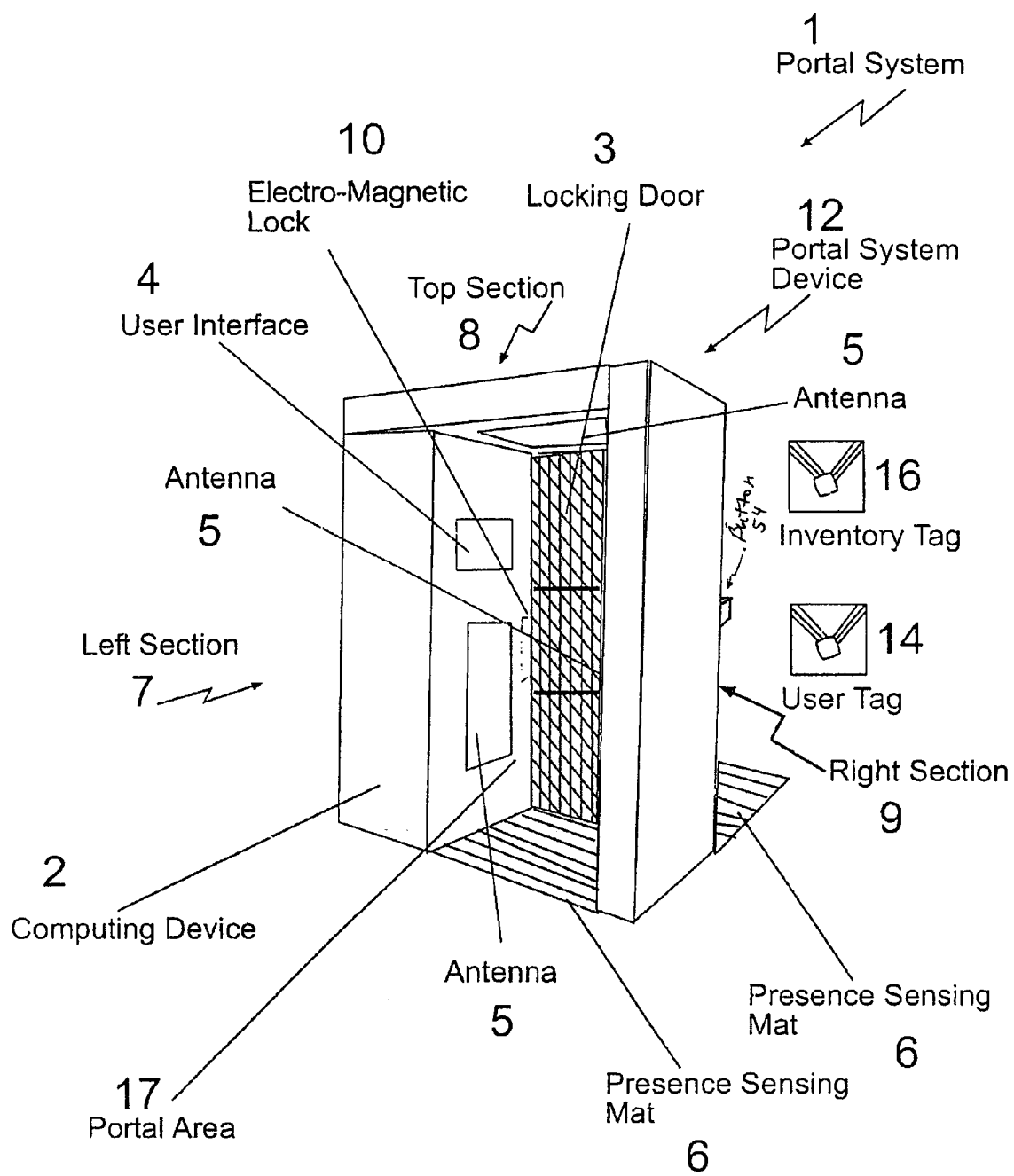
FIG. 1 is a perspective view of a portal system.

Disclosed herein are systems, devices, and methods that monitor a controlled space and track materials or items in inventory carried or otherwise transported in and out of the controlled space. Referring now in more detail to the figures in which like reference numerals identify corresponding parts, FIG. 1 is a perspective view of an embodiment of a portal system that tracks and monitors the items in a controlled space. The portal system 1 includes a portal device 12 and radio frequency tag 14, 16. The portal device 12 includes a left section 7, a top section 8, and a right section 9. The ends of the top section 8 are fixedly coupled to the top ends of the left and right sections 7, 9. The portal device 12 is placed at an entrance or exit of the controlled space (not shown), typically outside of the entrance or exit of the controlled space.

The portal device 12 is coupled to a locking door 3, typically between the portal device 12 and the controlled space. The locking door 3 prevents a user that is not authorized from entering and exiting the controlled space. The portal device 12 forms a portal area 17 that the user enters and interacts with the portal device 12 to unlock the locking door 3. The portal area 17 is typically between the left section 7 and right section 9 of the portal device 12. The portal area 17 is an area that the portal device 12 can receive data from the user either wirelessly via radio frequency tag 14 or mechanically via a graphical user interface 4.

The portal device 12 includes an electromagnetic lock 10 that is fixedly coupled to the portal device 12. More particularly, the electromagnetic lock 10 is fixedly coupled to the back of the left section 7 of the portal device 12 to engage the locking door 3 such that the lock 10 can lock or unlock the locking door 3. It should be noted that the electro-mangetic lock 10 can be fixedly coupled anywhere on the portal device 12 so long that the electro-magnetic lock 10 engages the locking door 3.

The portal device 12 includes two presence sensing mats 6A-B that are placed at or near the portal area 17. One presence sensing mat 6A is fixedly coupled to the floor between the left section 7 and right section 9 of the portal device 12. Another presence sensing mat 6B is fixedly coupled to the floor behind the locking door 3 and in the controlled space. The presence sensing mat 6 determines whether the user and inventory are entering or exiting the controlled space. For example, when the user enters the controlled space, the presence sensing mat 6A on the floor between sections 7, 9 detects the user entering the portal area 17. When the user is verified by the portal device 12 that the user is authorized to enter, the presence sensing mat 6B located behind the locking door 3 and in the controlled space verifies that the user has entered the controlled space. When the user exits the controlled space, the presence sensing mat 6A located between the sections 7, 9 of the portal device 12 detects the user exiting the controlled space and verifies that the user has exited the portal area 17 of the portal device 12 and out of the controlled space.

The left section 7 of the portal device 12 includes a computing device 2, antenna 5A, and user graphical interface 4. The computing device 2 is located inside the left section 7 of the portal device 12. The antenna 5A and user interface 4 are fixedly coupled on the right of the section 7. The right section 9 of the portal device 12 includes antenna 5B that is fixedly coupled on the left of the section 9 and an unlock button 54 that is fixedly coupled on the back of the section 9.

The top section 8 of the portal device 12 includes an antenna 5C that is fixedly coupled to the bottom of the top section 8. The antennas 5A-C, presence sensing mats 6A-B, and the user interface 4 are positioned in the portal area 17 so that the user can interact with these components as the user enters the portal device 12. The portal area 17 is the area that the antennas 5A-C and presence sensing mats 6A-B can detect the user and radio frequency tags 14, 16, typically between the left section 7 and right section 9 of the portal device 12.

The portal system 1 also includes radio frequency tags, particularly user tag 14 and inventory tag 16. The user tag 14 is typically attached to a user and the inventory tag 16 is typically attached to inventory, which is stored in the controlled space. When the user brings the inventory into the controlled space, the user goes into the portal area 17 to interact with the portal device 12. The user tag 14 attached to the user transmits a signal that indicates the identification of the user and the inventory tag 16 attached to the inventory transmits a signal that indicates the identification of the inventory. The portal device 12 wirelessly receives signals from the user tag 14 and the inventory tag 16 via antennas 5A-C of sections 7, 8, 9 of the portal device 12.

It should be noted that the electrical components, such as the antennas 5A-C, presence sensing mats 6A-B, computing device 2, electromagnetic lock 10, antennas 5A-C and user interface 4 can be rearranged and positioned anywhere on the portal device 12 other than the location shown in FIG. 1 and described above. For example, the user interface can be rearranged to be positioned in front of left section 7 of the portal device or on the left side of the right section 9 of the portal device.

In an alternative embodiment, the computing device 2 can be located in a remote location away from the portal device 12. In another alternative embodiment, the portal system 1 can include a second user interface that is located inside the controlled space so that the user can interact with the second user interface before the user exits the controlled space. In yet another alternative embodiment, the portal system 1 can include a second portal area inside the controlled space in which the second portal area is monitored by antennas 5 and presence sensing mat 6.

Figure 2:
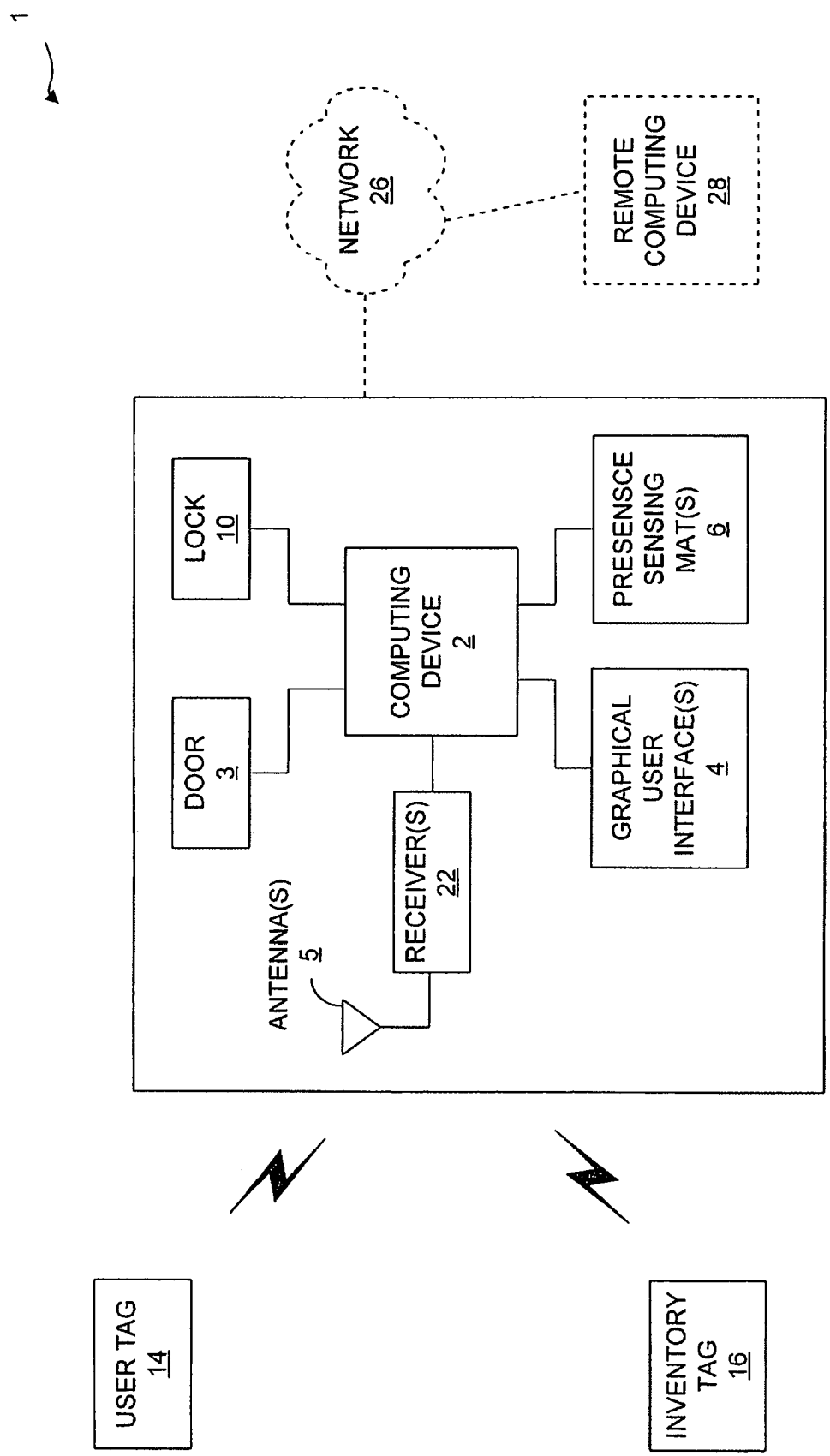
FIG. 2 is a schematic view of the portal system shown in FIG. 1.

FIG. 2 is an exemplary schematic view of a portal device 12 that communicates with a user tag 14 and an inventory tag 16 as shown in FIG. 1. The portal device 12 includes a computing device 2 that is electrically coupled to one or more graphical user interfaces 4, one or more receivers 22, one or more presence sensing mats 6A-B, door 3 and lock 10. The receiver 22 is electrically coupled to one or more antennas 5A-C that wirelessly receive signals from radio frequency tags 14, 16 that are attached to the user and to the inventory. The computing device 2 receives the radio frequency signals from the receiver 22. The computing device 2 tracks and monitors the user and inventory based on the radio frequency signals.

The computing device 2 is configured to lock or unlock the door 3 via the lock 10 based on data entered by a user through the graphical user interface 4 upon entering the controlled space. In an alternative embodiment, the computing device is configured to lock or unlock the door 3 via the lock 10 based on data received from the signals received from the user tag 14, the inventory tag 16, and the presence sensing mat 6.

The computing device 2 can determine from the radio frequency signal of the user radio frequency tag whether the user is authorized to enter and exit the controlled space. Further, the user may be required to enter a code through the graphical user interface along with having a user radio frequency tag to determine whether the user is authorized to enter or exit the controlled space. The computing device 2 can determine whether the user has exceeded a threshold value of inventory based on the total value of inventory that the user has taken out of the controlled space. The computing device 2 can provide a notification signal to an administrator based on the total value of inventory.

The presence sensing mat 6 detects the user exiting and entering the controlled space. The presence sensing mat 6 is configured to transmit a motion signal to the computing device 2 indicating whether the user and the inventory are exiting or entering the controlled space. Based on the motion signal of the presence sensing mat 6 and the signals from the radio frequency tags 14, 16, the computing device 2 can monitor and track which inventory the user has taken in and out of the controlled space.

In an alternative embodiment, the portal device 12 can be connected to a remote computing device 28 via a network 26 so that the portal device 12 can communicate with the remote computing device 28. The remote computing device 28 can transmit new or updated user information, cost account information, security information, replenishment information, and inventory information to the portal device 12. The computing device 2 can transmit monitored and tracked information to the remote computing device 28 so that the information can be stored at a second location.

Figure 3:
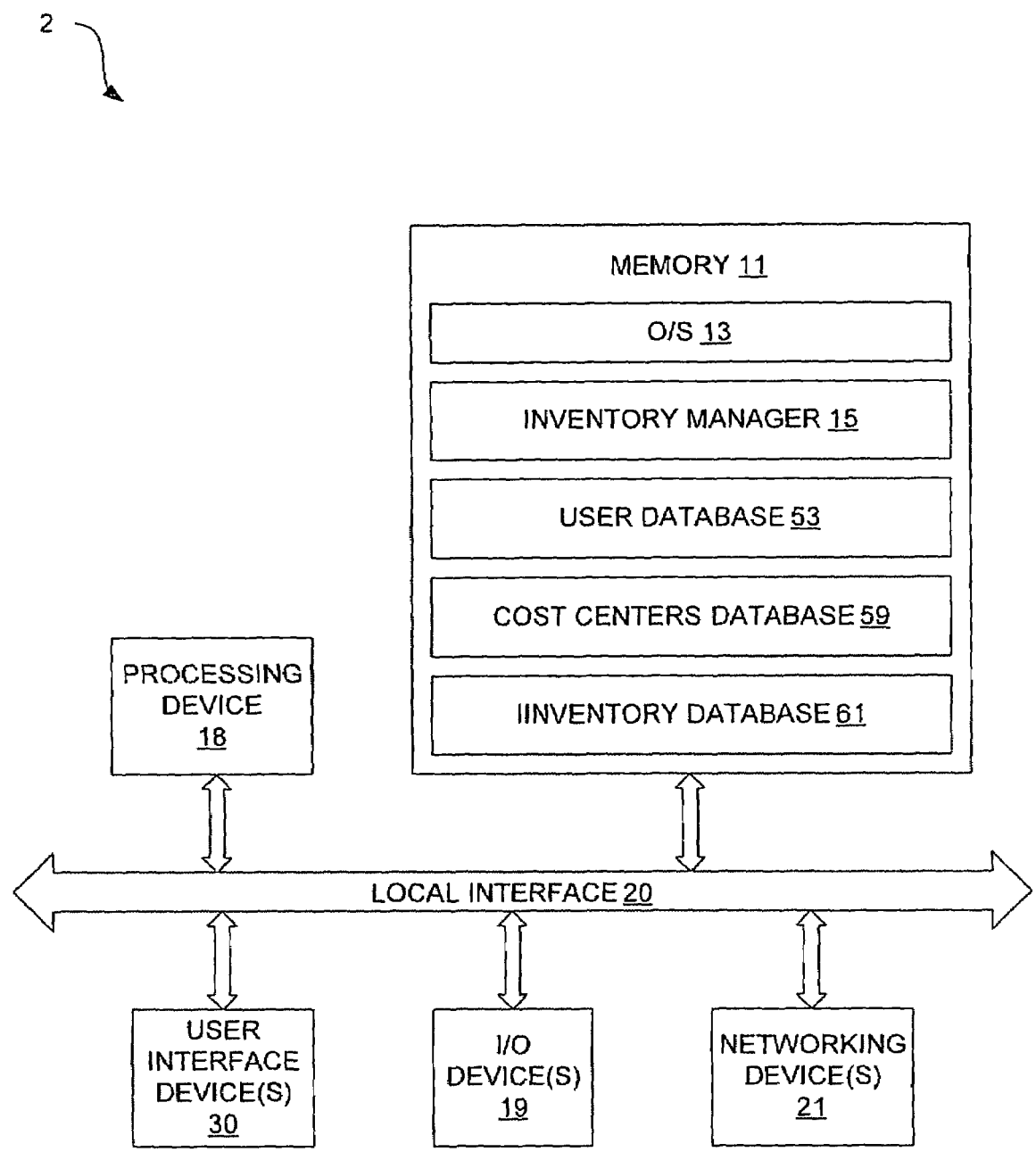
FIG. 3 is a block diagram of the computing device shown in FIGS. 1 and 2.

FIG. 3 is a block diagram illustrating an examplary architecture for the computing device 2 shown in FIG. 1. As indicated in FIG. 3, the computing device 2 comprises a processing device 18, memory 11, one or more user interface devices 30, one or more I/O devices 19, and one or more networking devices 21, each of which is connected to a local interface 20. The processing device 18 can include any custom made or commercially available processor, a central processing unit (CPU) or an auxiliary processor among several processors associated with the computing device 2, a semiconductor based microprocessor (in the form of a microchip), or a macroprocessor. The memory 11 can include any one or a combination of volatile memory elements (e.g., random access memory (RAM, such as DRAM, SRAM, etc.)) and nonvolatile memory elements (e.g., ROM, hard drive, tape, CDROM, etc.).

The one or more user interface devices 30 comprise those components with which the user (e.g., administrator) can interact with the computing device 2. Where the computing device 2 comprises a server computer or similar device, these components can comprise those typically used in conjunction with a PC such as a keyboard and mouse.

The one or more I/O devices 19 comprise components used to facilitate connection of the computing device 2 to other devices and therefore, for instance, comprise one or more serial, parallel, small system interface (SCSI), universal serial bus (USB), or IEEE 1394 (e.g., Firewire™) connection elements. The networking devices 21 comprise the various components used to transmit and/or receive data over a network 26, where provided. By way of example, the networking devices 21 include a device that can communicate both inputs and outputs, for instance, a modulator/demodulator (e.g., modem), a radio frequency (RF) or infrared (IR) transceiver, a telephonic interface, a bridge, a router, as well as a network card, etc.

The memory 11 normally comprises various programs (in software and/or firmware) including an operating system (O/S) 13 and an inventory manager 15. The O/S 13 controls the execution of programs, including the inventory manager 15, and provides scheduling, input-output control, file and data management, memory management, and communication control and related services. The inventory manager 15 facilitates the process for monitoring and tracking of inventory and a user. Operation of the inventory manager 15 is described in relation to FIGS. 8 and 9.

The memory 11 further includes user database 53, cost center database 59, and inventory database 61. The databases 53, 59, 61 facilitate the computing device 2 to determine whether the user are authorized to enter or exit the controlled space. The databases 53, 59, 61 further facilitates the computing device 2 to associate the inventory and cost of the inventory with the cost centers and the user as the user takes the inventory into and out of the controlled space. The databases 53, 59, 61 are described in relation to FIGS. 4 and 5.

Figure 4:
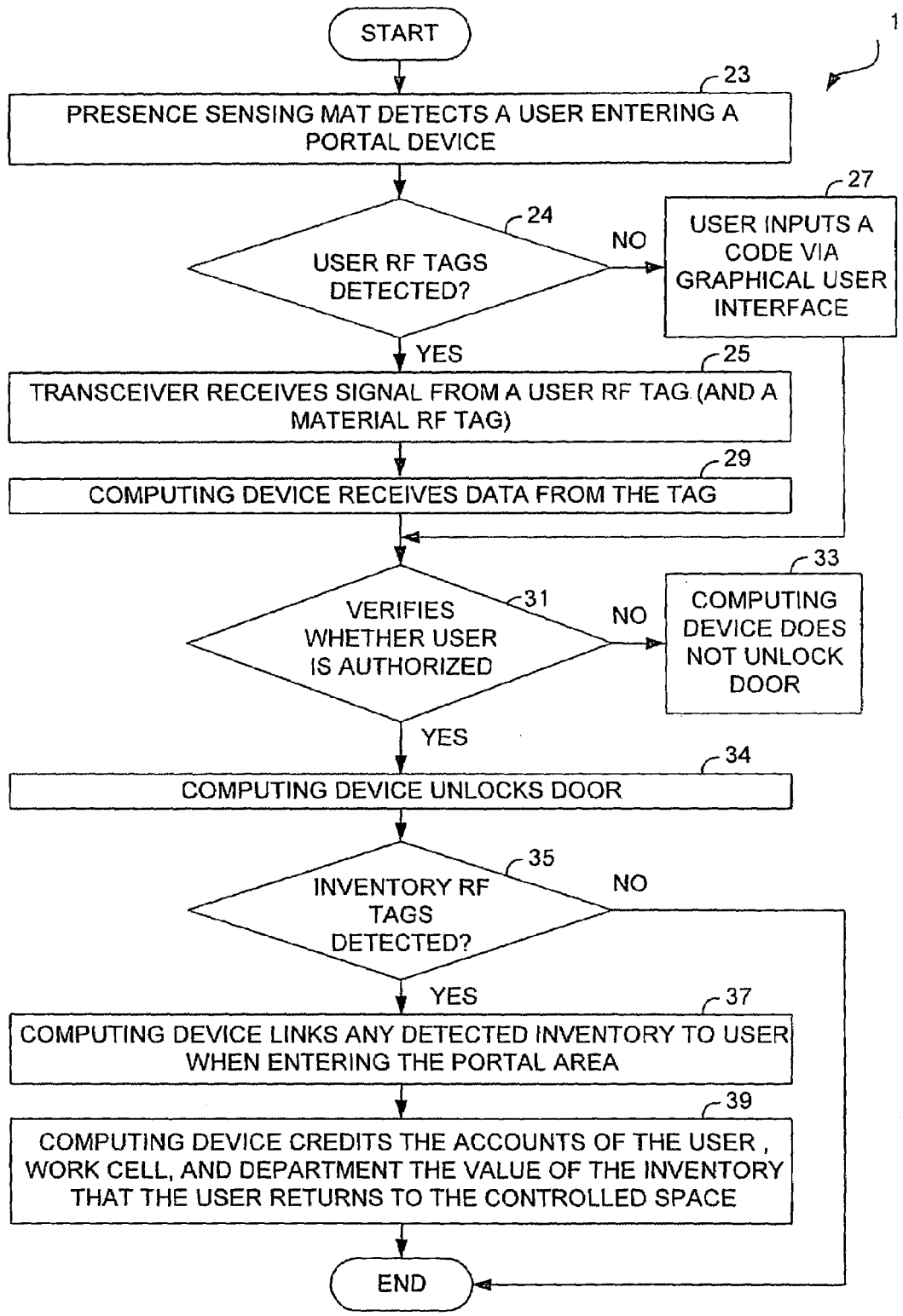
FIG. 4 is a block diagram of an embodiment of a database maintained in the memory of the computing device shown in FIG. 3.

FIG. 4 is high-level example of databases stored in memory shown in FIG. 3. The databases in memory 11 (FIG. 3) include user database 53, cost center database 59, and inventory database 61. Each database is linked to each other. For example, the user database 53 is linked to center database 59 and inventory database 61. The cost center database 59 is linked to user database 53 and inventory 61. The inventory database 61 is linked to cost center database 59 and user database 53.

The databases 53, 59, 61 provide information about the user, inventory, departments, work cells, shifts, costs, etc. For example, the user database 53 has information about the user, the department that the user is in, the shift the user works, the work cell the user is in, the total charged value of the inventory that the user takes out of the controlled space, the total credited value of the inventory that the user returns to the controlled space, the cost threshold that the user is allowed to take from the controlled space, the time and date the user enters or exits the controlled space, etc. The cost center database 59 has cost information about the departments, shifts, work cells, job, etc. The cost information includes, but is not limited to, the total charged value of the inventory associated to the departments, shifts, work cells, job, etc., the total credited value of the inventory associated to the departments, shifts, work cells, job, etc., the cost threshold of the inventory associated to the departments, shifts, work cells, job, etc. The inventory database 61 has information about the inventory, the cost of the inventory, the time and date that the inventory enters or exits the controlled space, etc.

The databases facilitate the portal system 1 to monitor and track the user, cost centers, and inventory. For example, if the user enters the portal area 17 of the portal system 1, the portal system 1 records the date and time that the user and inventory enters and exits into the portal device 12. The portal system 1 also records the value of the inventory to credit or charge the user and/or cost centers. The portal system 1 links the detected inventory and the value of the inventory to the user and cost centers.

Figure 5:
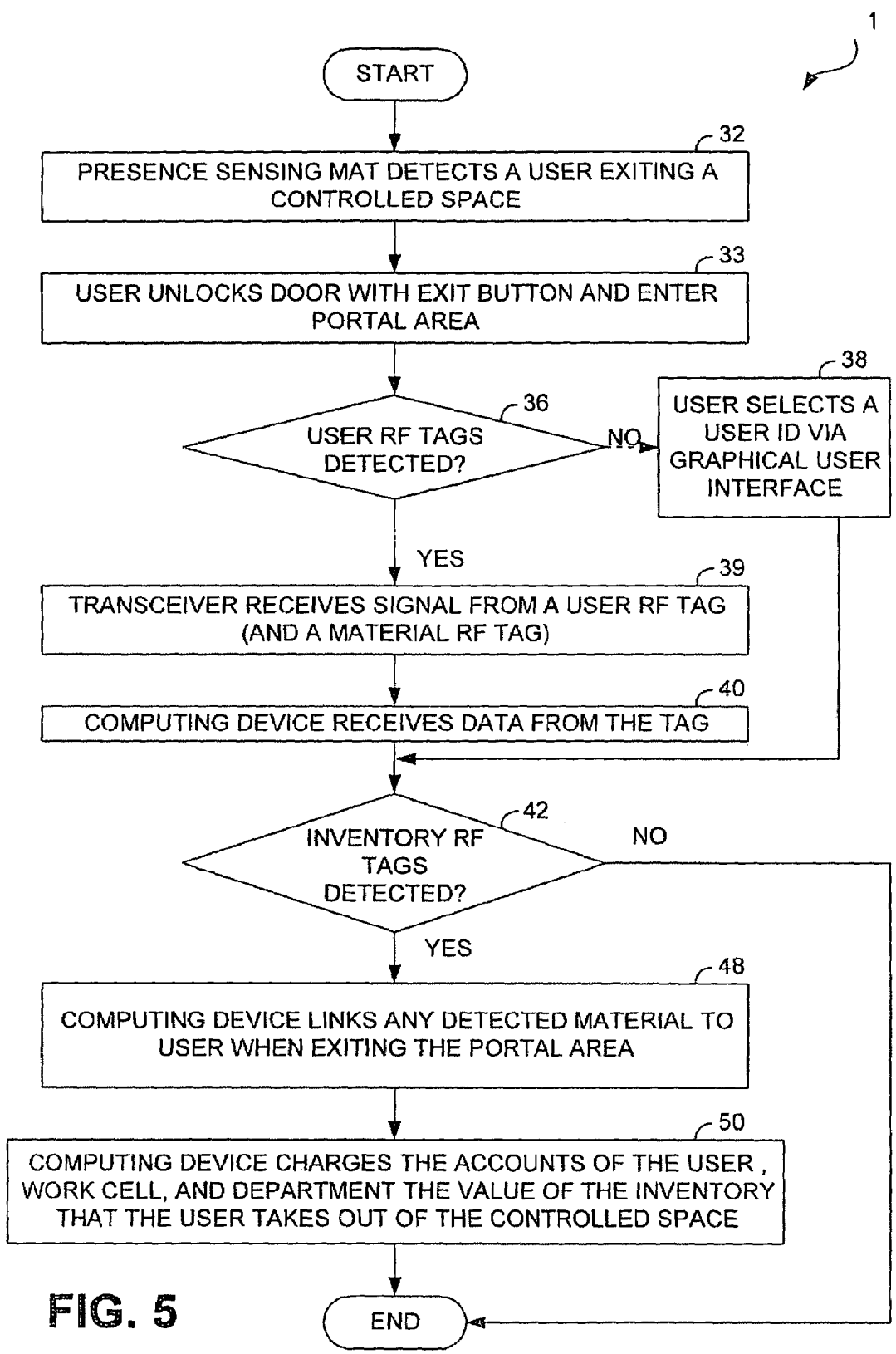
FIG. 5 is a block diagram of an embodiment of the database shown in FIG. 4.

FIG. 5 illustrates an examplary database of the memory 11. The portal system can be used in the airplane industry. For example, John Doe 53A works for an airline company and maintains the wings of airplanes as his job 59A. John Doe 53A works in the maintenance department 59B of the airline. Therefore, the user database 53 includes John Doe 53A. John Doe 53A is linked to job 59A and department 59B of the cost centers database 59, and to the inventory 61A-C of the inventory database 61 that he took from the controlled space.

If John Doe 53A exits a controlled space with a screwdriver 61A, drill bits 61B, and powerdrill 61C, the portal system links the inventory 61A-C to John Doe 53A. The portal system further charges the total value (e.g, $150) of the inventory 61A-C to John Doe 53A and to the cost centers 59A-B that the user is associated with. John Doe 53A can be assigned a cost threshold of $500, the job 59A can be assigned a cost threshold of $1,000 and the maintenance department 59B can be assigned a cost threshold of $10,000. John Doe 53A can take inventory (individually and in combination) not exceeding $500. Many users can be assigned to job 59A and maintenance department 59B. Thus, the users (individually and in combination) associated to the job 59A and maintenance department 59B can take inventory (individually and in combination) not exceeding $1,000 and $10,000, respectively.

Figure 6:
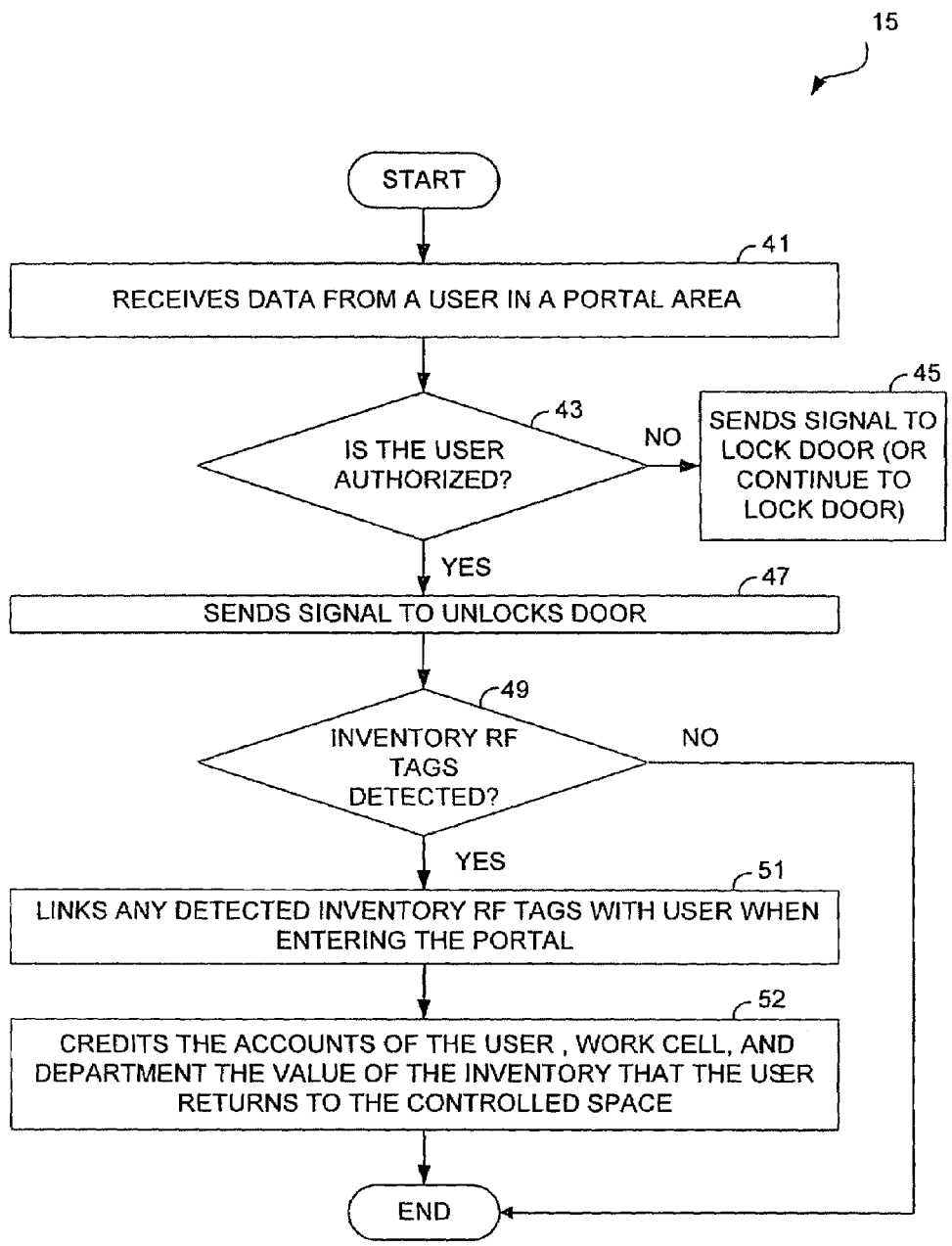
FIG. 6 is a flow diagram that illustrates an embodiment of operation of the portal system shown in FIG. 1.

FIG. 6 illustrates an example of operation of the portal system that monitors and tracks inventory and user entering in a controlled space. In block 23, the user is detected entering the portal area 17 of the portal system 1 via the presence sensing mat 6. The computing device 2 determines whether there is a user radio frequency tag 14 in the portal area 17 of the portal device 12, as indicated in block 25. If there is no radio frequency signals, the user is requested to input a code via graphical user interface 4, as indicated in block 27. The code can be any numerical, alphabetical, alphanumerical, and/or symbols that can be entered into the graphical user interface 4. If the computing device 2 determines that a user radio frequency tag is detected, the receiver 22 receives a signal from the user radio frequency tag, as indicated in block 29. The receiver 22 sends the radio frequency signal to the computing device 2, as indicated in block 31.

In block 33, once the code or the radio frequency signal is received by the computing device 2, the computing device 2 verifies whether the user is authorized to enter the controlled space. In an alternative embodiment, the computing device 2 can require the user to input a code via graphical user interface 4 even when the computing device 2 detects a radio frequency tag. The computing device 2 can verify whether the user is authorized based on both the radio frequency signal and the code.

If the user is not authorized to enter the controlled space, the computing device 2 does not unlock the door 3, as indicated in block 35. If the user is authorized to enter the controlled space, the computing device 2 unlocks the door 3 via the electro-magnetic lock 10, as indicated in block 37. The computing device 2 then detects for any radio frequency signal related to inventory that is with the user in the portal area 17, as shown in block 39. If the computing device 2 detects inventory in the portal area 17, the computing device 2 links the detected inventory to the user entering the portal area 17, as indicated in block 41.

The computing device 2 then credits the accounts of the user and/or cost centers the value of the inventory that the user returns inventory to the controlled space, as indicated in block 43. For example, when the user returns a screwdriver and rivet gun that are both worth $100, the user, the user's work cell, and the user's department are credited $100. If the computing device 2 does not detect inventory in the portal area 17, the computing device 2 does not link or credit the user and/or cost centers.

Figure 7:
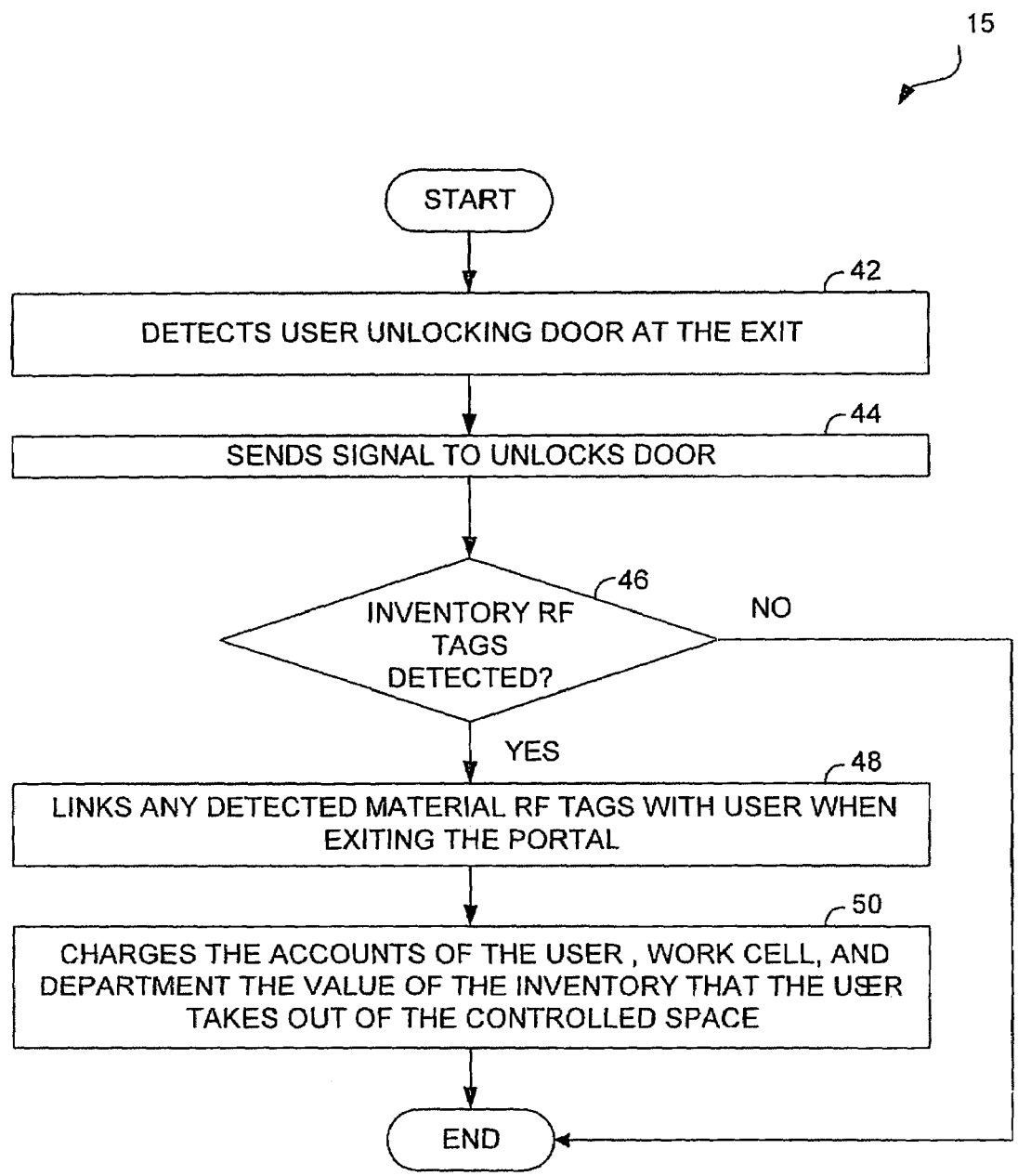
FIG. 7 is a flow diagram that illustrates an embodiment of operation of the portal system shown in FIG. 1.

FIG. 7 illustrates an example of operation of the portal system 1 that monitors and tracks inventory and user exiting a controlled space. In block 47, the user is detected exiting the portal area 17 of the portal system 1 via the presence sensing mat 6. The user presses an unlock button 54 and unlocks the door for the user to exit the controlled space, as indicated in block 49. The computing device 2 determines whether there is a user radio frequency tag in the portal area 17 of the portal device 12, as indicated in block 51. If there is no radio frequency signal, the user is requested to select a user identification code via graphical user interface located inside the portal area 17, as indicated in block 55. If the computing device 2 determines that a user radio frequency tag 14 is detected, the receiver 22 receives a signal from the user radio frequency tag 14, as indicated in block 57. The receiver 22 sends the radio frequency signal to the computing device 2, as indicated in block 60.

In block 63, the computing device 2 then detects for any radio frequency signal related to inventory that are with the user in the portal area 17. If the computing device 2 detects inventory in the portal area 17, the computing device 2 links the detected inventory to the user exiting the portal area 17, as indicated in block 65. The computing device 2 can further charge the account of the user and/or the cost centers the value of the inventory that the user takes out of the controlled space, as indicated in block 67. For example, when the user takes a screwdriver and rivet gun that are both worth $100 out of the controlled space, the user, the user's work cell, and the user's department are charged $100. If the computing device 2 does not detect inventory in the portal area 17, the computing device 2 does not link or charge the user and/or cost centers.

In the case where the user enters the controlled space with a first inventory item(s) and exits with a second inventory item(s), the computing device 2 unlinks the user from the first inventory item(s) and links the user to the inventory item(s). The computing device credits the user (or the work cell, department, etc.) the value of the first inventory item(s) and then charges the user (or the work cell, department, etc.) the value of the second inventory item(s).

The computing device 2 can determine whether the user and/or the cost center have exceeded the budget usage or threshold value of inventory, as indicated in block 69. The computing device can provide a notification signal, such as an electronic reporting, to an administrator based on the total value of inventory that the user has taken out of the controlled space, as indicated in block 71. The notification signal indicates that the budget usage of the inventory has exceeded a threshold value. For example, the user has a limit of $100 value of inventory, the work cell has a $1,000 value of inventory and the department has a $10,000 value of inventory. If the user takes inventory exceeding the $100 value, the computing device 2 can provide an electronic reporting to administrator that supervises the user. If one or more users that works in the same work cell takes inventory exceeding the $1,000 value, the computing device 2 can provide an electronic reporting to an administrator that supervises the work cell. If one or more users that works in the same department takes inventory exceeding the $10,000 value, the computing device 2 can provide an electronic reporting to an administrator that supervises the department.

Figure 8:
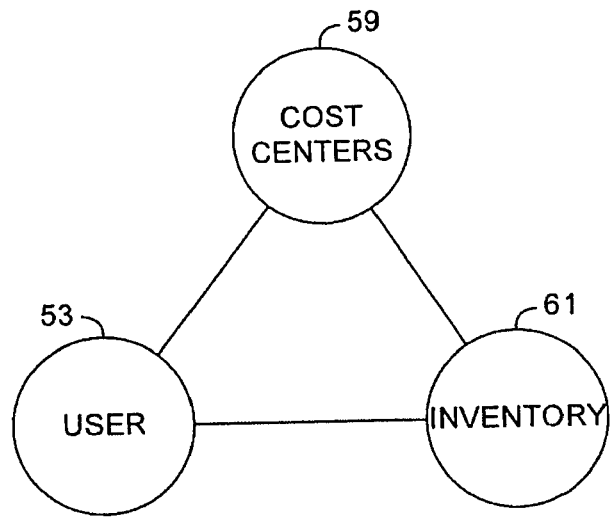
FIG. 8 is a flow diagram that illustrates an embodiment of operation of an inventory manager of the computing device shown in FIG. 3.

FIG. 8 illustrates an example of operation of the inventory manager 15 of the portal device 12 that facilitates monitoring and tracking inventory entering a controlled space. In block 75, the inventory manager 15 receives data from the user in a portal area 17 either a signal from a user radio frequency tag 14 or code that is entered by the user via a graphical user interface 4. The inventory manager 15 determines whether the user is authorized to enter the controlled space based on the received data, as indicated in block 77.

If the user is not authorized to enter the controlled space, the inventory manager 15 sends no signal to unlock the door preventing the user from entering the controlled space, as indicated in block 79. If the user is authorized to enter the controlled space, the inventory manager 15 unlocks the door via the electromagnetic lock 10, as indicated in block 81. The inventory manager 15, in block 83, determines whether any inventory is detected in the portal area 17. The inventory manager 15 detects for any radio frequency signal related to inventory that is with the user in the portal area 17. If the inventory manager 15 detects any inventory in the portal area 17, the inventory manager 15 links the detected inventory to the user exiting the portal area 17, as indicated in block 85.

In block 87, the inventory manager 15 credits the accounts of the user and/or the cost centers the value of the inventory that the user returns to the controlled space. For example, when the user returns a screwdriver and rivet gun that are both worth $100, the user, the user's work cell, and the user's department are credited $100. If the inventory manager 15 does not detect inventory in the portal area 17, the inventory manager 15 does not link or credit the user or cost centers.

Figure 9:
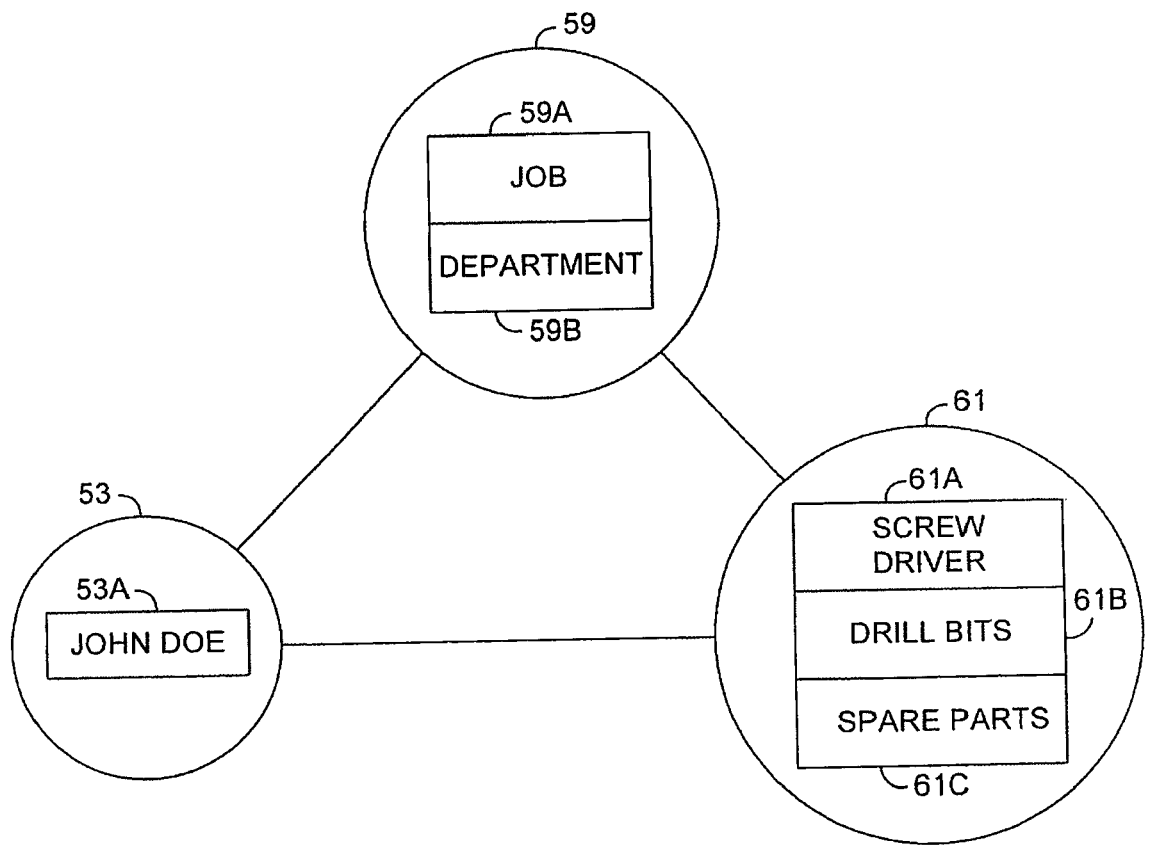
FIG. 9 is a flow diagram that illustrates an embodiment of operation of an inventory manager of the computing device shown in FIG. 3.

FIG. 9 illustrates an example of operation of the inventory manager 15 of the portal device 12 that facilitates monitoring and tracking inventory exiting a controlled space. In block 91, the inventory manager 15 detects the user unlocking the door at the exit of the controlled space by pressing an unlock button 54. The unlock button 54 sends signal to the locking door 3 to unlock, as indicated in block 93. The inventory manager 15, in block 95, determines whether any inventory is detected in the portal area 17. The inventory manager 15 detects for any radio frequency signal related to inventory that is with the user in the portal area 17.

In block 97, if the inventory manager 15 detects inventory in the portal area 17, the inventory manager 15 links any detected inventory tags with the user when exiting through the portal area 17. The inventory manager 15 charges the accounts of the user and/or cost centers the value of the inventory that the user takes out of the controlled space, as indicated in block 99.

If no inventory is detected, the inventory manager 15 does not link the user to any inventory nor charge the user, work cell, department, etc. In the case where the user enters the controlled space with a first inventory item and exits with a second inventory item, the inventory manager 15 unlinks the user from the first inventory item and links the user to the second inventory item. The inventory manager 15 further credits the user (or work cell, department, etc.) the value of the first inventory and charges the user (or work cell, department, etc.) the value of the second inventory.

The inventory manager 15 can determine whether the user and/or the cost center have exceeded the budget usage or threshold value of inventory, as indicated in block 101. The inventory manager 15, as indicated in block 103, can provide a notification signal, such as an electronic reporting, to an administrator based on the total value of inventory that the user has taken out of the controlled space.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

Therefore, having thus described the invention, at least the following is claimed:

1. A portal device associated with a controlled space comprising:
    a computing device having a user database that includes information associated with inventory, each inventory being assigned an inventory value that is calculated based on a purchase price of the inventory, the user database further including the total value of inventory that the user has taken out of the controlled space, the total value of inventory being calculated based on the inventory value, the computing device being configured for receiving signals from a user, the computing device being configured to determine whether the user has exceeded a threshold value of inventory based on the total value of inventory that the user has taken out of the controlled space, the computing device being further configured to provide a notification signal to an administrator based on the total value of inventory that the user has taken out of the controlled space; and
    a locking door being coupled to the computing device, the computing device being configured to unlock the locking door based on the received signals from the user.

2. The portal device as defined in claim 1, wherein the computing device comprises a cost centers database that includes the total value of the inventory assessed to one of cost centers, wherein the cost centers database facilitates the computing device to determine whether the user has exceeded a threshold value of inventory based on the total value of inventory that the user has taken out of the controlled space, wherein the cost centers database facilitates the computing device to provide a notification signal to an administrator based on the total value of inventory that the user has taken out of the controlled space.

3. The portal device as defined in claim 1, wherein the computing device comprises
    a graphical user interface, the graphical user interface being located outside the controlled space; and
    wherein the computing device is configured to unlock the locking door based on code inputted by a user through the graphical user interface upon entering and exiting the controlled space.

4. The portal device as defined in claim 3, wherein the computing device determines whether the user is authorized to enter the controlled space based on the first signal and/or code entered by the user through the graphical user interface.

5. The portal device as defined in claim 1, wherein the controlled space contains inventory, the portal device further comprising:
    a receiver being configured to receive a first signal from a first radio frequency tag and a second signal from a second radio frequency tag, the receiver being configured to send the first and second signals to the computing device, the first radio frequency tag being attached to the user and the second radio frequency tag being attached to the inventory; and wherein the computing device is configured to lock and unlock the locking door based on the first signal from the first radio frequency tag, the computing device being configured to link the inventory to the user and track the inventory and the user via the first and second signals as the user takes the inventory in and out of the controlled space through the locking door.

6. The portal device as defined in claim 5, wherein the computing device comprises a user database that facilitates the computing device to determine whether the user is authorized to enter the controlled space based on the first signal.

7. The portal device as defined in claim 1, further comprising a presence sensing mat that detects the user exiting and entering the controlled space, the presence sensing mat being coupled to the computing device and configured to transmit a motion signal indicating whether the user is exiting or entering the controlled space.

8. The portal device as defined in claim 1, further comprising an unlock button that automatically unlocks the locking door, wherein the unlock button is located inside the controlled space.

9. A portal system for use in connection with a controlled space comprising:

inventory;

a portal device comprising:

a computing device having a user database that includes information associated with inventory, each inventory being assigned an inventory value that is calculated based on a purchase price of the inventory, the user database further including the total value of inventory that the user has taken out of the controlled space, the total value of inventory being calculated based on the inventory value, the computing device being capable-of configured for receiving signals from a user, the computing device being configured to determine whether the user has exceeded a threshold value of inventory based on the total value of inventory that the user has taken out of the controlled space, the computing device being further configured to provide a notification signal to an administrator based on the total value of inventory that the user has taken out of the controlled space; and a locking door being coupled to the computing device, the computing device being configured to unlock the locking door based on the received signals from the user.

10. The portal system of claim 9, wherein the computing device comprises a cost centers database that includes the total value of the inventory assessed to one of cost centers, wherein the cost center database facilitates the computing device to determine whether the user has exceeded a threshold value of inventory based on the total value of inventory that the user has taken out of the controlled space, wherein the cost centers database facilitates the computing device to provide a notification signal to an administrator based on the total value of inventory associated to the one of the cost centers.

11. The portal system of claim 9, wherein the portal device comprises:

a receiver being configured to receive a signal from a first radio frequency tag, and send the signal to the computing device; and an inventory manager linking the first radio frequency tag to a specific inventory item in the inventory.

12. The portal system as defined in claim 11, further comprising a second radio frequency tag that is attached to a user, wherein the receiver is configured to receive a signal from the second radio frequency tag and send the signal to the computing device, wherein the computing device is configured to unlock the locking door based on the signal from the second radio frequency tag, the computing device being configured to link the inventory to the user and track the user and inventory via the signals as the user takes the inventory in and out of the controlled space through the locking door.

13. The portal system as defined in claim 9, further comprising a presence sensing mat that monitors the user exiting and entering the controlled space, the presence sensing mat being coupled to the computing device and configured to transmit a motion signal indicating whether the user is exiting or entering the controlled space.

14. The portal system as defined in claim 13, wherein the portal device further comprises a user database that facilitates the computing device to determine whether the user has exceeded a threshold value of inventory based on the total value of inventory that the user has taken out of the controlled space, wherein the user database facilitates the computing device to provide a notification signal to an administrator based on the total value of inventory that the user has taken out of the controlled space.

15. The portal system as defined in claim 13, wherein the portal device further comprises the computing device that determines whether the user is authorized to enter the controlled space based on the second signal and/or code entered by the user through a graphical user interface.

16. The portal system as defined in claim 9, wherein the portal device further comprises an unlock button that automatically unlocks the locking door, wherein the unlock button is located inside the controlled space.

17. A method of monitoring a controlled space, the method comprising the steps of:

receiving data from a user that identifies the user;

associating the user with a total value of inventory that the user has taken out of the controlled space, each inventory being assigned an inventory value that is calculated based on a purchase price of the inventory, the total value of inventory being calculated based on the inventory value;

determining whether the user is authorized to unlock a locking door based on the received data;

determining whether the user has exceeded a threshold value of inventory based on the total value of inventory;

unlocking the locking door based on the received data; and providing a notification signal to an administrator based on the total value of inventory.

18. The method of claim 17, further comprising:

associating the total value of inventory that the user has taken out of the controlled space to a cost center;

determining whether the cost center has exceeded a threshold value of inventory based on the total value of inventory; and providing a notification signal to an administrator based on the total value of inventory associated to the cost center.

19. The method of claim 17, further comprising receiving data from the user via a graphical user interface located outside of the controlled space.

20. The method of claim 17, further comprising tracking inventory based on the received data when the user enters and exits the controlled space.

21. The method as defined in claim 17, further comprising:
  receiving signals from multiple radio frequency tags, respectively; a radio frequency tag being attached to a user and a radio frequency tag being attached to the inventory;
  locking and unlocking the locking door based on the signal from the radio frequency tag that is attached to the user;
  linking the inventory to the user; and
  tracking the inventory and the user as the user takes the inventory in and out of the controlled space through the locking door.

22. The method as defined in claim 17, further comprising monitoring the user exiting and entering the controlled space via a presence sensing mat, the presence sensing mat being configured to transmit a motion signal indicating whether the user is exiting or entering the controlled space.

23. The method as defined in claim 17, further comprising determining whether provide a notification signal based on a cost centers database.

24. The method as defined in claim 17, further comprising determining whether the user is authorized to enter the controlled space based on the signal and/or code entered by the user through the graphical user interface.

25. The method as defined in claim 17, further comprising automatically unlocking the locking door via an unlock button, wherein the unlock button is located inside the controlled space.

\* \* \* \* \*